(12) United States Patent
Pastorutti

(10) Patent No.: US 11,192,138 B2
(45) Date of Patent: Dec. 7, 2021

(54) APPARATUS TO MAKE DECORATIONS ON PREFABRICATED WATER-PROOFING BITUMEN-MIX MEMBRANES AND CORRESPONDING PLANT FOR THE PRODUCTION OF SAID PREFABRICATED WATER-PROOFING MEMBRANES

(71) Applicant: BOATO INTERNATIONAL S.P.A. A SOCIO UNICO, Monfalcone (IT)

(72) Inventor: Gino Pastorutti, Palmanova (IT)

(73) Assignee: BOATO INTERNATIONAL S.P.A. A SOCIO UNICO, Monfalcone (IT)

( * ) Notice: Subject to any disclaimer, the term of this patent is extended or adjusted under 35 U.S.C. 154(b) by 0 days.

(21) Appl. No.: 16/839,864

(22) Filed: Apr. 3, 2020

(65) Prior Publication Data

US 2020/0230641 A1 Jul. 23, 2020

Related U.S. Application Data

(62) Division of application No. 15/111,947, filed as application No. PCT/IB2015/051242 on Feb. 18, 2015, now Pat. No. 10,610,887.

(30) Foreign Application Priority Data

Feb. 18, 2014 (IT) .......................... UD2014A000028

(51) Int. Cl.
*B05D 1/32* (2006.01)
*B29C 41/26* (2006.01)
(Continued)

(52) U.S. Cl.
CPC .................. *B05D 1/32* (2013.01); *B05C 3/00* (2013.01); *B05C 19/04* (2013.01); *B29C 41/26* (2013.01);
(Continued)

(58) Field of Classification Search
CPC ......... B05C 19/04; B05C 1/0808; B05C 1/14; B05C 1/16; B05C 3/00; B05D 1/32; B29C 41/26; B29C 41/28; E04D 5/02
See application file for complete search history.

(56) References Cited

U.S. PATENT DOCUMENTS 3,798,718 A 3/1974 Trifunovic
4,662,155 A 5/1987 Chasman
(Continued)

FOREIGN PATENT DOCUMENTS

DE 102006035856 2/2008

OTHER PUBLICATIONS

International Search Report and Written Opinion, issued in the corresponding international PCT application No. PCT/IB2015/051242, dated May 26, 2015, 8 pages.

*Primary Examiner* — Alexander M Weddle
(74) *Attorney, Agent, or Firm* — Hamre, Schumann, Mueller & Larson, P.C.

(57) ABSTRACT

Apparatus to make decorations on a prefabricated water-proofing bitumen-mix membrane, wherein the decorations are made by depositing solid particles, in the form of flakes, grains, sand or grit, suitable to adhere to at least one surface of said prefabricated water-proofing bitumen-mix membrane. The apparatus includes at least one transfer member provided with a support surface suitable to receive, support and transfer the solid particles toward the surface to be enhanced of the prefabricated water-proofing bitumen-mix membrane. The support surface is provided with a plurality of cavities suitable to receive the solid particles. The cavities are made inside at least one surface portion of the support surface and the surface portion, essentially reproducing the shape and sizes of at least one of the decorations.

9 Claims, 3 Drawing Sheets

(51) Int. Cl.
*B29C 41/28* (2006.01)
*E04D 5/02* (2006.01)
*B05C 19/04* (2006.01)
*B05C 3/00* (2006.01)
*B05C 1/08* (2006.01)
*B05C 1/16* (2006.01)
*B05C 1/14* (2006.01)

(52) U.S. Cl.
CPC ............... *B29C 41/28* (2013.01); *E04D 5/02* (2013.01); *B05C 1/0808* (2013.01); *B05C 1/14* (2013.01); *B05C 1/16* (2013.01)

(56) References Cited

U.S. PATENT DOCUMENTS

| | | |
|---|---|---|
| 5,814,369 A * | 9/1998 | Bockh .................. B05D 1/28 118/211 |
| 5,945,131 A | 8/1999 | Harvey et al. |
| 6,440,216 B1 | 8/2002 | Aschenbeck |
| 2002/0160108 A1 | 10/2002 | Aschenbeck |
| 2014/0044872 A1 | 2/2014 | Pervan |

* cited by examiner

APPARATUS TO MAKE DECORATIONS ON PREFABRICATED WATER-PROOFING BITUMEN-MIX MEMBRANES AND CORRESPONDING PLANT FOR THE PRODUCTION OF SAID PREFABRICATED WATER-PROOFING MEMBRANES

FIELD OF THE INVENTION

The present invention concerns an apparatus to make decorations, patterns or designs on a prefabricated water-proofing bitumen-mix membrane, usable, for example, for covering roofs or external surfaces of dwellings, such as terraces, apartment blocks or industrial plants, but not only.

The present invention also concerns a plant for the production of prefabricated water-proofing bitumen-mix membranes comprising said apparatus.

BACKGROUND OF THE INVENTION

Prefabricated water-proofing bitumen-mix membranes are known, used for water-proofing external surfaces of buildings such as roofs, terraces in apartment blocks, industrial warehouses, private residences, but not only.

Plants for making bitumen-mix membranes are also known. They normally comprise an application unit configured to apply on a support, also called brace, a bituminous material or mixture, such as oxidized bitumen, distilled bitumen or modified bitumen.

Such plants also comprise at least an apparatus to make a protective and enhancing finishing cover on at least one surface of the prefabricated bitumen-mix membrane. The cover is usually made with solid particles with a mineral base, such as slate, basalt, ferrite or suchlike in the form of flakes, granules, sand or grit, hereafter indicated generically by the term grains.

The solid particles also have the function of protecting at least the surface of the bitumen-mix membrane exposed to atmospheric events, for example rain, snow, ice or solar radiation.

Apparatuses are also known that, by depositing the solid particles, obtain enhancing decorations on the water-proofing bitumen-mix membrane.

These apparatuses usually comprise a distribution device that includes at least a hopper for containing the solid particles and a transfer member configured to transfer the solid particles in a metered manner from the hopper to the membrane to be covered.

The transfer member, for example a rotary drum or a belt wound between two cylinders and selectively translatable between the two cylinders, is provided on an external surface with a plurality of cavities, each of which having a size and shape substantially similar to those of the decoration to be reproduced on the surface of the membrane to be covered.

The cavities are filled on each occasion with the solid particles in the hopper.

The activation of the transfer member determines the transfer and release onto the prefabricated water-proofing bitumen-mix membrane of the solid particles to obtain the desired decorations on the membrane.

Given the particular configuration of the cavities, which substantially reproduce the same shape and size of the decoration to be obtained, these apparatuses do not allow to release the solid particles onto the membrane in a desired and controlled manner. In fact, during the rotation of the transfer member, the particles are not suitably held by the cavities and are unloaded together, as soon as the cavity is disposed in a vertical or sub-vertical position.

This entails both a blurring of the decoration with respect to the ideal contour consisting of the template, and also a deposit of a non-uniform layer of solid particles on the surface of the bituminous membrane, which can lead to a dis-homogeneous esthetic effect, and at some points reduces the efficacy of the covering given by the solid particles against atmospheric events.

A transfer member is also known from documents US-A-5.814.369 and US-A-2002/0160108, provided with a support surface on which a plurality of cavities are made. Each cavity is suitable to receive the solid particles that are delivered by feed devices.

The transfer member can be a rotary drum, as in the case described in US-A-5.814.369, or a conveyor belt wound between two cylinders as described in US-A-2002/0160108.

To prevent an uncontrolled delivery of the solid particles contained in the cavities, US-A-5.814.369 describes a holding device located in contact with part of the support surface of the rotary drum and which, for at least the part of the support surface of the transfer member located vertical or sub-vertical during use, maintains the solid particles in the cavities of the transfer member.

The holding device comprises a flexible belt wound around a plurality of return rolls that define at least a segment of the flexible belt that positions itself adherent to the external surface of the rotary drum.

The presence of a flexible belt in contact with the support surface is not able to ensure that only the solid particles contained in the cavities are transferred to the surface of the bituminous membrane. In this solution, in fact, possible solid particles that are interposed between the conveyor belt and the support surface of the transfer member and which are not contained in the cavities are also transferred to the membrane to be enhanced. This results in decorations that are not very precise or defined.

The solid particles that are interposed between the flexible belt and the support surface increase the wear to which the transfer member is subjected during use, due to the abrasive action of the solid particles. This reduces the working life of the transfer member and/or the flexible belt, and requires frequent maintenance operations and replacements of the components.

One purpose of the present invention is to obtain an apparatus to make decorations on prefabricated water-proofing bitumen-mix membranes that allows a better precision in defining decorations and that at the same time allows to obtain a greater uniformity of the covering layer obtained using solid particles.

Another purpose of the present invention is to make an apparatus to make decorations that is simple and economical.

Another purpose of the present invention is to obtain an apparatus to make decorations that increases the working life of its components and reduces the maintenance operations on them.

Another purpose of the present invention is to obtain a plant for the production of prefabricated water-proofing bitumen-mix membranes with a pleasant appearance and provided with precious decorations that precisely fill the cavities and define the contours.

Another purpose of the present invention is to obtain an apparatus to make decorations on prefabricated water-proofing bitumen-mix membranes that is simple, economical and reliable.

The Applicant has devised, tested and embodied the present invention to overcome the shortcomings of the state of the art and to obtain these and other purposes and advantages.

SUMMARY OF THE INVENTION

The present invention is set forth and characterized in the independent claims, while the dependent claims describe other characteristics of the invention or variants to the main inventive idea.

In accordance with the above purposes, the present invention concerns an apparatus to make decorations on a prefabricated water-proofing bitumen-mix membrane.

The decorations are made by depositing solid particles, in the form of flakes, grains, sand or grit, that adhere to a surface of the prefabricated water-proofing bitumen-mix membrane.

The apparatus comprises at least one transfer member provided with a support surface suitable to receive, support and transfer solid particles toward the surface to be enhanced of the prefabricated water-proofing bitumen-mix membrane.

In accordance with a characteristic feature of the present invention, the support surface is provided with a plurality of cavities suitable to receive the solid particles, each cavity defining an area of reduced size with respect to the surface portion on which the decoration is made. The cavities are made inside at least one surface portion of the support surface and the surface portion essentially reproduces the shape and sizes of at least one of the decorations.

The use of cavities of reduced size with respect to the surface portion on which the decoration is made allows to control precisely the unloading of the solid particles which are intended to cover a determinate zone of the decoration, since each cavity exerts a holding action on the solid particles contained therein until the transfer member is in the delivery condition. This prevents unwanted dispersal of solid particles outside the pre-established contours of the decorations, and makes the solid particles deposited on the decoration uniform.

In accordance with another aspect of the present invention, the apparatus comprises an occlusion roller disposed in contact with the support surface and configured to hold the solid particles inside the respective cavities before they are deposited.

The use of an occlusion roller, compared with conventional solutions, for example using a belt wound around return rolls, allows to simplify the production complexity of the apparatus to make decorations, reducing its overall cost.

Moreover, compared with conventional solutions, this solution allows to reduce maintenance interventions on the components of the apparatus as well as to reduce wear at least on the transfer member.

Here and hereafter in the description by the term occlusion roller we mean any deformable body, with an oblong development, and configured to adapt to at least part of the support surface of the transfer member once it is pressed against the latter. In particular, the occlusion roller can be defined as a block with a circular, rectangular, polygonal or mixed linear-curved cross section, and positioned with its lengthwise development substantially parallel to the portion of the surface support of the transfer member on which the occlusion roller rests.

The occlusion roller can have a lengthwise development substantially equal to the width of the support surface affected by the cavities.

In accordance with possible variant forms of embodiment, several occlusion rollers can be provided for each transfer member, located aligned with respect to each other in a direction parallel to the longitudinal development of the transfer member.

In possible forms of embodiment, the transfer member comprises at least a drum, the circumferential surface of which defines the support surface on which the cavities are made.

The present invention also concerns a plant for the production of a prefabricated water-proofing bitumen-mix membrane, comprising:
- a unit for applying a bituminous material on a support to produce a prefabricated water-proofing bitumen-mix membrane;
- at least one apparatus for making decorations on the prefabricated water-proofing bitumen-mix membrane as described above and located downstream of the bituminous material application unit described above.

In possible implementations, the plant according to the present invention comprises a plurality of apparatuses for making decorations, for example to obtain decorations by means of different solid particles delivered by the different apparatuses.

The present invention also concerns a method for making decorations on a prefabricated water-proofing bitumen-mix membrane, which provides to deposit solid particles in the form of flakes, grains, sand or grit, to make them adhere to at least one surface of the prefabricated water-proofing bitumen-mix membrane.

In accordance with the present invention, the method provides to deliver the solid particles on a support surface of a transfer member, positioning them in a plurality of cavities made on at least one portion of the support surface and suitable to receive the solid particles.

The method also provides to transfer the solid particles from the cavities toward the surface to be enhanced of the prefabricated water-proofing bitumen-mix membrane by actuating the transfer member.

According to one aspect of the method, during the actuation of the transfer member it provides to hold the solid particles inside the cavities, before they are deposited, by means of an occlusion roller positioned in contact with the support surface.

BRIEF DESCRIPTION OF THE DRAWINGS

These and other characteristics of the present invention will become apparent from the following description of some forms of embodiment, given as a non-restrictive example with reference to the attached drawings wherein:

FIG. 4b is a section view of a variant of FIG. 4a;

FIG. 4c is a section view of another variant of FIG. 4a;

FIG. 4d is a section view of another variant of FIG. 4a;

Figure 1:
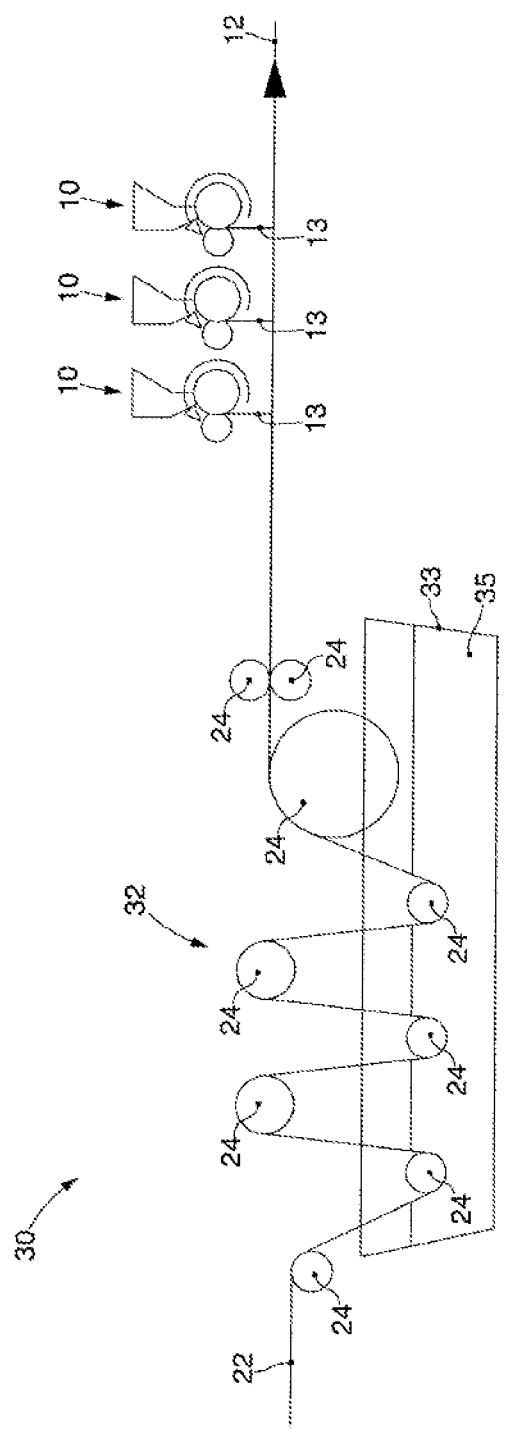
FIG. 1 is a schematic view of part of a plant for the production of prefabricated water-proofing bitumen-mix membranes comprising an apparatus to make decorations in accordance with the present invention.

To facilitate comprehension, the same reference numbers have been used, where possible, to identify identical common elements in the drawings. It is understood that elements and characteristics of one form of embodiment can conveniently be incorporated into other forms of embodiment without further clarifications.

DETAILED DESCRIPTION OF FORMS OF EMBODIMENT

We shall now refer in detail to the various forms of embodiment of the present invention, of which one or more examples are shown in the attached drawing. Each example is supplied by way of illustration of the invention and shall not be understood as a limitation thereof. For example, the characteristics shown or described insomuch as they are part of one form of embodiment can be adopted on, or in association with, other forms of embodiment to produce another form of embodiment. It is understood that the present invention shall include all such modifications and variants.

FIG. 1 is used to describe forms of embodiment of parts of a plant 30 comprising at least one apparatus 10, in this case three apparatuses 10, for making decorations 20 on a prefabricated water-proofing bitumen-mix membrane 12.

The prefabricated water-proofing bitumen-mix membrane 12 comprises at least a support 22, also known as brace, to which a bituminous material is associated.

The support 22 can be in the form of a strip or gauze, with the function of reinforcing the prefabricated water-proofing bitumen-mix membrane 12.

The support 22 can be made of a textile material or an artificial material, such as glass fiber, aramid fiber or polyester based fiber.

In some forms of embodiment, the bituminous material 35 can be chosen for example from the group comprising oxidized bitumen, distilled bitumen, or modified bitumen.

To this purpose the plant 30 can comprise an application unit 32 configured to apply or impregnate the support 22 with the bituminous material 35 contained for example in a containing tank 33, and to define the prefabricated water-proofing bitumen-mix membrane 12.

Downstream of the application unit 32 the at least one apparatus 10 to make the decorations 20 is located.

The decorations 20 are made by depositing solid particles 13, in the form of flakes, grains, sand or grit, which adhere to a surface of the prefabricated water-proofing bitumen-mix membrane 12.

The solid particles 13 are typically mineral based material, such as flakes of slate, granules of basalt, ferrite or suchlike. The solid particles 13 act as a cover for the prefabricated water-proofing bitumen-mix membrane 12 and the particular disposition and distribution on the surface allows to confer thereon an enhancing appearance.

The solid particles 13 are made to adhere to the prefabricated water-proofing bitumen-mix membrane 12 when the bituminous material 35 is still in a liquid/viscous condition.

When the prefabricated water-proofing bitumen-mix membrane 12 is completely cooled, and hence the bituminous material 35 is completely solidified, the solid particles 13 remain adhering to the prefabricated water-proofing bitumen-mix membrane 12.

Figure 2:
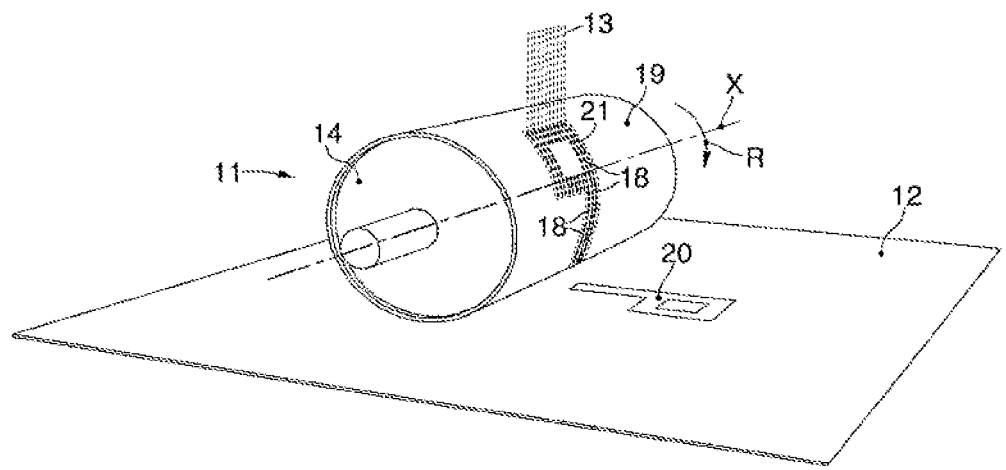
FIG. 2 shows forms of embodiment of a part of an apparatus in accordance with the present invention.
Figure 3:
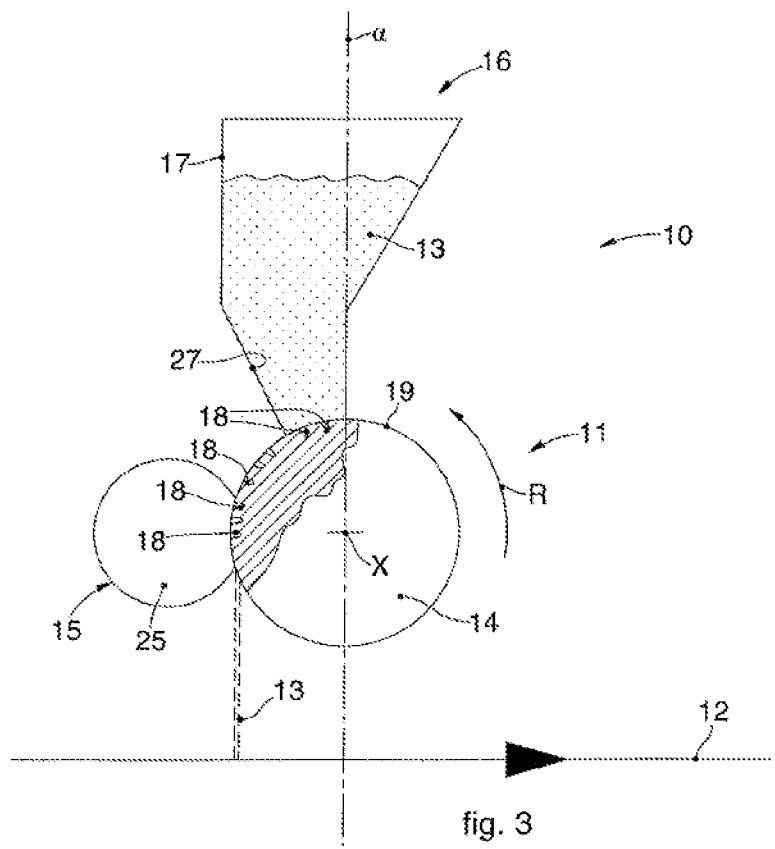
FIG. 3 is a schematic representation of an apparatus in accordance with forms of embodiment of the present invention.

In forms of embodiment described using FIGS. 2 and 3, the apparatus 10 comprises at least one transfer member 11 configured to receive, support and suitably transfer the solid particles 13 from a feed device 16 to the surface to be enhanced of the prefabricated water-proofing bitumen-mix membrane 12. In particular, the transfer member 11 is configured to deposit the solid particles 13 in a metered manner and to define the decorations 20 on the surface to be enhanced of the prefabricated water-proofing bitumen-mix membrane 12. The transfer member 11 is provided with a support surface 19 on which the solid particles 13 are disposed and supported before they are deposited.

In at least one surface portion 21, the support surface 19 is provided with a plurality of cavities 18. The surface portion 21 substantially reproduces the shape and size of at least one of the decorations 20 that are to be obtained on the surface of the prefabricated water-proofing bitumen-mix membrane 12.

Each of the cavities 18 of one of the surface portions 21 of the support surface 19 of the transfer member 11 is suitable to contain a determinate quantity of solid particles 13 that can be unloaded onto the prefabricated water-proofing bitumen-mix membrane 12 by suitably driving a member for holding the solid particles, described hereafter, at least until a determinate cavity 18 is disposed in an unloading position. This prevents the solid particles 13 from being unloaded in a non-controlled and non-uniform manner.

The cavities 18 are smaller than the surface portion 21 of the support surface 19 and allow to control the metering of a suitable quantity of solid particles 13.

Figure 4A:
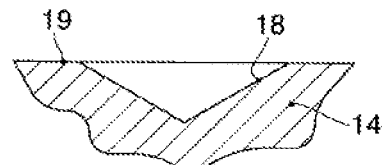
FIG. 4a is a section view of a detail of a component of the apparatus in FIG. 3 in accordance with forms of embodiment of the present invention.
Figure 4C:
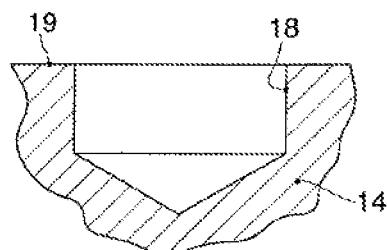
Figure 4B:
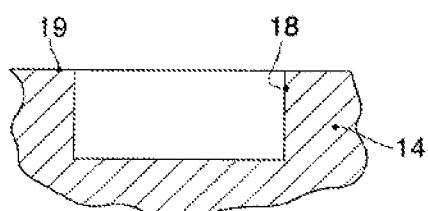
Figure 4D:
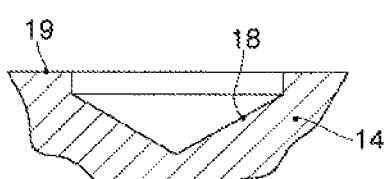

In forms of embodiment described with reference to FIGS. 4a, 4b, 4c, 4d, each cavity 18 can have a section shape chosen from triangular (FIG. 4a), rectangular (FIG. 4b), or a combination thereof (FIGS. 4c, 4d). For example, the cavities 18 can have a conical shape, or pyramidal, cylindrical, parallelepiped or partly conical and partly cylindrical, possibly in relation to different types of solid particles 13 to be delivered.

The disposition of the cavities 18 inside the surface portion 21 can allow to obtain different effects on the decoration 20.

In forms of embodiment described with reference to FIG. 3, the cavities 18 can be disposed in a grid-like configuration, equidistant with respect to each other, filling the surface portion 21 almost uniformly.

Figure 8:
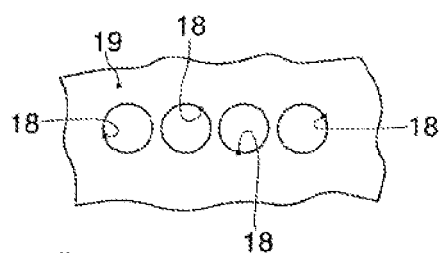
FIG. 8 shows a variant of FIG. 7.

A linear disposition of the cavities 18, shown for example in FIG. 8, allows to obtain a decoration 20 with a blurred effect.

A staggered disposition of the cavities 18 instead allows to obtain a more marked and covering effect.

In some forms of embodiment, the transfer member 11 comprises at least a drum 14, the circumferential surface of which defines the support surface 19 on which the cavities 18 are made.

The drum 14 can be made to rotate by suitable drive means, not shown, around an axis of rotation X that can coincide with the axis of development of the drum 14.

In particular, when the cavities 18 of the drum 14 face upward, they receive the solid particles 13 from the feed device 16 and, rotating around the axis of rotation X in the direction of rotation, indicated by arrow R, unload the solid particles 13 onto the prefabricated water-proofing bitumen-mix membrane 12.

In forms of embodiment described using FIG. 3, the feed device 16 can comprise a hopper 17 provided with an unloading aperture 27 facing toward the support surface 19 and through which the solid particles 13 are unloaded to fill the cavities 18 of the support surface 19.

According to possible forms of embodiment, the unloading aperture 27 can be disposed in direct contact with the support surface 19 so as to limit unwanted losses of solid particles 13.

According to possible forms of embodiment, the unloading aperture 27 can be provided with a doctor suitable to contact the support surface 19 of the transfer member 11 to clean it of the solid particles 13 and to leave them only inside the cavities 18.

According to possible formulations of the invention (FIG. 3), the unloading aperture 27 is disposed off center with respect to a plane □, perpendicular to the plane defined by the prefabricated water-proofing bitumen-mix membrane 12 and on which the axis of rotation X of the drum 14 lies.

In particular, the unloading aperture 27 can be disposed off center from the side of the drum 14 from which the solid particles 13 are deposited on the prefabricated water-proofing bitumen-mix membrane 12.

This positioning of the hopper 17 therefore prevents the solid particles 13 from falling on the opposite side of the drum 14 with respect to the side on which the solid particles 13 are deposited on the drum 14. This would create defects on the design of the prefabricated water-proofing bitumen-mix membrane 12.

The apparatus 10 can comprise, as we said, a holding device 15, disposed in contact with the support surface 19 and configured to hold the solid particles 13 inside the cavities 18 of the transfer member 11 and to remove the solid particles 13 that are on the support surface 19 of the transfer member 11 outside said cavities 18.

In the form of embodiment shown in FIG. 3, the holding device 15 comprises an occlusion roller 25 that has at least one operating position in which it is positioned in contact with the drum 14 on the side on which the solid particles 13 are deposited on the prefabricated water-proofing bitumen-mix membrane 12.

The occlusion roller 25 can be made of an elastically deformable material able to adapt to the shape of at least part of the support surface 19, following its development.

Merely by way of example, it is provided that the occlusion roller 25 is made of a material chosen from a group comprising sponge, foam rubber or expanded polymer materials.

The occlusion roller 25 has a substantially cylindrical conformation with a radius R. During use, the occlusion roller 25 is installed in a fixed position with respect to the transfer member 11, and at a distance from the support surface 19 that is less than said radius R. This condition determines a deformation of the surface portion of the occlusion roller 25 in contact with the support surface 19, so that the occlusion roller 25 affects a surface portion of the support surface 19 and holds the solid particles 13 inside the cavities 18.

The elastically deformable material allows in particular to compress the solid particles 13 inside the cavities 18 also during the rotation of the drum 14, performing an effective holding action.

The occlusion roller 25 thus made allows both to clean the support surface 19 and also to bring the solid particles 13 inserted in the cavities 18 flush with the external edge thereof. Furthermore, the presence of an occlusion roller 25 prevents solid particles 13 from staying and remaining between the support surface 19 and the occlusion roller 25, causing wear on the latter.

The occlusion roller 25 is located on the unloading side where the solid particles 13 are unloaded, and in contact with at least one portion of the support surface 19 that is located substantially vertical or sub-vertical.

During use, the occlusion roller 25 holds the solid particles 13 present in each cavity 18 until the moment suitable for depositing said solid particles 13 on the prefabricated water-proofing bitumen-mix membrane 12, that is, when each cavity or group of cavities 18 is near the prefabricated water-proofing bitumen-mix membrane 12.

Furthermore, it is preferable to keep the distance between the drum 14 and the prefabricated water-proofing bitumen-mix membrane 12 small, so as to effectively control the stream of solid particles 13.

Figure 6:
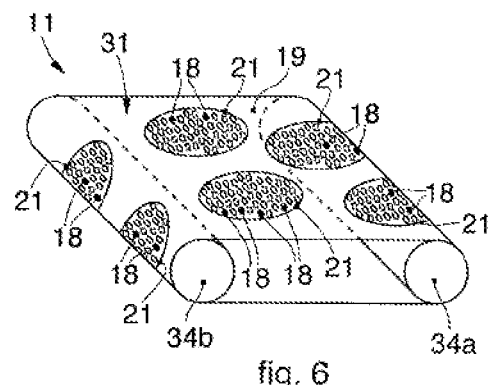
FIG. 6 is a schematic perspective view of a possible component of an apparatus in accordance with a variant form of embodiment.
Figure 7:
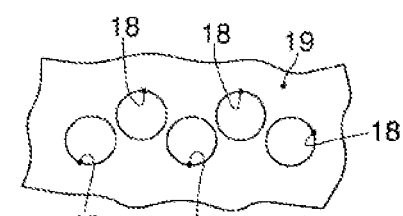
FIG. 7 is a schematic plan view of a detail of an apparatus in accordance with some forms of embodiment of the invention.

In forms of embodiment described using FIG. 6, the transfer member 11 comprises a belt 31 and at least two rolls 34a, 34b, on which the belt 31 is mounted.

The belt 31 can be for example closed on itself and wound around the rolls 34a and 34b as shown in FIG. 6.

The rolls 34a, 34b can be provided with drive means suitable to make them rotate, consequently moving the belt 31. The belt 31 defines, with a surface located externally to the rolls 34a, 34b, the support surface 19.

With a belt 31 it is possible to reproduce decorations 20 with particular surface extensions.

According to some forms of embodiment described with reference to FIG. 1, the plant 30 can comprise a plurality of apparatuses 10, each of which is suitable to deposit solid particles 13 in a controlled manner, in a predetermined pattern.

Using a plurality of apparatuses 10 can allow, for example, to make a plurality of different decorations 20, or one or more polychrome decorations.

In this latter case, in fact, each apparatus 10 can release a different type of solid particles 13, for example with different granulometric or chromatic characteristics and in a predetermined pattern.

Each transfer member 11 can be configured to reproduce different decorations 20, thanks to different surface portions 21 made on the support surfaces 19 of each transfer member 11.

Figure 5:
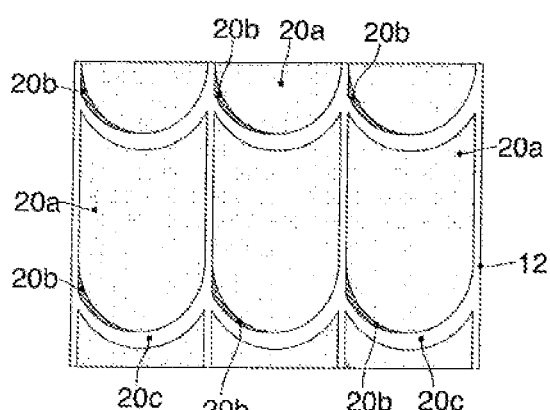
FIG. 5 is a representation of a possible water-proofing bitumen-mix membrane obtained with an apparatus according to the present invention.

FIG. 5 shows decorations, in this case first decorations 20a, second decorations 20b and third decorations 20c, each made by a respective apparatus 10.

In particular, by suitably combining decorations 20a, 20b, and 20c it is possible to enhance in a desired manner the surface of a prefabricated water-proofing bitumen-mix membrane 12 to reproduce, for example (FIG. 5), a tile roof with a three-dimensional perception of the tiles.

The plant 30 can comprise, for example, rollers 24 configured and positioned to define a desired travel of the support 22 or the prefabricated water-proofing bitumen-mix membrane 12.

In possible implementations, the rollers 24 can be configured to actively contribute to the movement of the support 22/prefabricated water-proofing bitumen-mix membrane 12 through the plant 30.

In other forms of embodiment, the rollers 24 can be configured only for the tautening and passage of the support 22/prefabricated water-proofing bitumen-mix membrane 12.

It is clear that modifications and/or additions of parts may be made to the apparatus to make decorations on a prefabricated water-proofing bitumen-mix membrane as described heretofore, without departing from the field and scope of the present invention.

It is also clear that, although the present invention has been described with reference to some specific examples, a person of skill in the art shall certainly be able to achieve many other equivalent forms of apparatus to make decorations on a prefabricated water-proofing bitumen-mix membrane, having the characteristics as set forth in the claims and hence all coming within the field of protection defined thereby.

The invention claimed is:

1. A method of making a decoration on a prefabricated water-proofing bitumen-mix membrane, the method comprising:
    depositing solid particles, in the form of flakes, grains, sand or grit, to make them adhere to at least one surface of the prefabricated water-proofing bitumen-mix membrane, the depositing including:
        delivering the solid particles on a support surface of a transfer member in a plurality of cavities suitable to receive the solid particles, the cavities being made in at least one surface portion of the support surface and the cavities in the at least one surface portion corresponding to a shape and size of the decoration, and
        transferring the solid particles from the cavities onto the at least one surface of the prefabricated waterproofing bitumen-mix membrane by actuating the transfer member, wherein during the actuation of the transfer member, the solid particles before being deposited are held inside the cavities by an occlusion roller positioned in direct contact with a portion of the support surface located vertical or sub-vertical.

2. The method as in claim 1, wherein the occlusion roller has at least one operating position in direct contact with the support surface on a side where the solid particles are deposited on the prefabricated water-proofing bitumen-mix membrane.

3. The method as in claim 1, wherein the occlusion roller is made of an elastically deformable material able to adapt to a shape of at least part of the support surface.

4. The method as in claim 1, wherein the transfer member comprises at least a drum with a circumferential surface that is the support surface in which the cavities are made, wherein the occlusion roller has at least one operating position located in direct contact against part of the support surface of the drum.

5. The method as in claim 1, wherein a feed device is provided to dispose the solid particles on the support surface.

6. The method as in claim 5, wherein the feed device comprises a hopper provided with an unloading aperture positioned off center, on a side where the solid particles are deposited, with respect to a plane on which an axis of rotation of the drum lies and which is located perpendicular to a plane defined by the prefabricated water-proofing bitumen-mix membrane.

7. The method as in claim 1, wherein each of the cavities has a cross section respectively chosen from triangular or rectangular.

8. The method as in claim 1, wherein the transfer member comprises a belt and at least two rolls on which the belt is mounted, the support surface being an external surface of the belt.

9. The method as in claim 1, wherein the occlusion roller has a fixed position with respect to the transfer member.

* * * * *